(12) United States Patent
Gandhi et al.

(10) Patent No.: US 11,072,374 B2
(45) Date of Patent: Jul. 27, 2021

(54) MORPHING FENDER SKIRT FOR A STEERED WHEEL

(71) Applicant: The Ohio State University, Columbus, OH (US)

(72) Inventors: Umesh N. Gandhi, Farmington Hills, MI (US); Marcelo J. Dapino, Columbus, OH (US); Venkata Siva C. Chillara, Columbus, OH (US); Leon M. Headings, Columbus, OH (US)

(73) Assignee: The Ohio State Innovation Foundation, Columbus, OH (US)

( * ) Notice: Subject to any disclaimer, the term of this patent is extended or adjusted under 35 U.S.C. 154(b) by 748 days.

(21) Appl. No.: 15/867,930

(22) Filed: Jan. 11, 2018

(65) Prior Publication Data
US 2019/0210657 A1 Jul. 11, 2019

(51) Int. Cl.
*B62D 25/00* (2006.01)
*B62D 25/18* (2006.01)
*B62D 35/00* (2006.01)
*B62D 37/02* (2006.01)
*B62D 25/16* (2006.01)

(52) U.S. Cl.
CPC ......... *B62D 25/182* (2013.01); *B62D 25/161* (2013.01); *B62D 25/186* (2013.01); *B62D 35/00* (2013.01); *B62D 37/02* (2013.01)

(58) Field of Classification Search
CPC .. B62D 25/182; B62D 25/161; B62D 25/186; B62D 35/00; B62D 37/02; B62D 35/008
USPC ....... 280/152.3, 847, 848, 849, 851; 293/58, 293/128; 296/198
See application file for complete search history.

(56) References Cited

U.S. PATENT DOCUMENTS

| | | | | |
|---|---|---|---|---|
| 2,017,227 A | * | 10/1935 | Barnhart | B62D 25/186 280/849 |
| 2,288,725 A | * | 7/1942 | Lyon | B62D 25/184 280/848 |
| 2,336,536 A | * | 12/1943 | Fergueson | B62D 25/184 280/848 |
| 2,421,634 A | | 6/1947 | Lyon | |

(Continued)

FOREIGN PATENT DOCUMENTS

| | | | | |
|---|---|---|---|---|
| DE | 723125 | | 7/1942 | |
| DE | 10312089 A1 | * | 10/2004 | B62D 25/182 |

(Continued)

OTHER PUBLICATIONS

"The BMW Vision Next 100 Concept showing wheels and more tricks!" https://www.youtube.com/watch?v=dm0QAwrMdaw (screen capture from Jan. 10, 2018 in 1 page).

*Primary Examiner* — James A Shriver, II
*Assistant Examiner* — Hilary L Johns
(74) *Attorney, Agent, or Firm* — Christopher G. Darrow; Darrow Mustafa PC

(57) ABSTRACT

A morphing fender skirt includes a rigid, open-ended arched base, stretchable exterior skin connected across the base, and a structural, bendable rib array connected over the base subjacent to the skin. The rib array is configured to bend between a flattened shape over the base, whereby the rib array imparts the flattened shape to the skin across the base, and a domed shape over the base, whereby the rib array imparts the domed shape to the skin across the base.

23 Claims, 5 Drawing Sheets

(56) References Cited

U.S. PATENT DOCUMENTS

| | | | | |
|---|---|---|---|---|
| 2,460,349 | A * | 2/1949 | Hessler | B62D 25/182 280/848 |
| 3,784,226 | A * | 1/1974 | Wilfert | B62D 25/186 280/157 |
| 3,866,943 | A * | 2/1975 | Innis | B62D 25/188 280/851 |
| 4,660,893 | A * | 4/1987 | Huntzinger | B60B 7/0006 301/37.41 |
| 5,460,411 | A * | 10/1995 | Becker | B62D 25/168 280/848 |
| 5,820,203 | A * | 10/1998 | Morelli | B60C 23/18 296/180.1 |
| 6,007,102 | A * | 12/1999 | Helmus | B62D 25/182 280/847 |
| 6,076,843 | A * | 6/2000 | Sewell | B62D 25/18 280/157 |
| 6,367,841 | B1 * | 4/2002 | Matthew | B62D 25/168 280/154 |
| 6,802,517 | B1 * | 10/2004 | Wuthrich | B62D 25/18 280/157 |
| 7,252,313 | B2 * | 8/2007 | Browne | B29C 33/308 293/128 |
| 7,921,584 | B2 | 4/2011 | Kestner | |
| 2003/0141714 | A1 * | 7/2003 | Matthew | B62D 25/168 280/848 |
| 2006/0157952 | A1 * | 7/2006 | Bonnaud | B62D 25/182 280/160 |
| 2008/0238140 | A1 * | 10/2008 | Kejha | B62D 29/008 296/181.1 |
| 2010/0078970 | A1 * | 4/2010 | Kim | B62D 25/16 296/198 |
| 2010/0217490 | A1 * | 8/2010 | Canfield | B62D 25/16 701/49 |
| 2011/0080019 | A1 * | 4/2011 | Castillo | B62D 25/182 296/180.1 |
| 2011/0304129 | A1 * | 12/2011 | Owens | B62D 25/182 280/849 |
| 2012/0013113 | A1 * | 1/2012 | Trenne | B62D 35/008 280/849 |
| 2013/0096781 | A1 * | 4/2013 | Reichenbach | B60Q 1/326 701/49 |
| 2018/0251161 | A1 * | 9/2018 | Wilson | B62D 25/188 |
| 2019/0009831 | A1 * | 1/2019 | Albertson | B62D 37/02 |
| 2020/0283072 | A1 * | 9/2020 | Ballarin | B60B 7/00 |

FOREIGN PATENT DOCUMENTS

| | | | |
|---|---|---|---|
| DE | 102008046314 A1 | 6/2009 | |
| DE | 102010009091 A1 * | 9/2010 | ........... B62D 25/186 |
| FR | 2571013 A1 | 4/1986 | |
| FR | 2933943 A1 * | 1/2010 | ............. B60R 19/00 |
| WO | WO-2019073276 A1 * | 4/2019 | ............. B62D 25/16 |

* cited by examiner

MORPHING FENDER SKIRT FOR A STEERED WHEEL

STATEMENT REGARDING FEDERALLY SPONSORED RESEARCH OR DEVELOPMENT

This invention was made with government support under grant number IIP1238286 awarded by the National Science Foundation. The government has certain rights in the invention.

TECHNICAL FIELD

The embodiments disclosed herein relate to the aerodynamics of vehicles and, more particularly, to the fender skirts employed in vehicles to realize improved aerodynamics.

BACKGROUND

Wheeled vehicles, in a known configuration, accommodate their wheels in wheel wells. While the wheel wells in these vehicles necessarily open from the underbody, so-called open wheel wells additionally open from the body. In relation to the body, the open wheel wells open, more specifically, from associated areas of the body known as fenders.

Open wheel wells contribute to the aerodynamic drag on the vehicles to which they belong. This is because when a vehicle with an open wheel well is driven along the ground, the opening of the open wheel well from its fender has the tendency to redirect, deflect or otherwise change the motion of free oncoming airflow over either the fender or the remainder of the body, or both.

Aerodynamics, of course, has long been a focus of vehicle design. Recognizing their contribution to aerodynamic drag, some vehicles eschew open wheel wells in favor of wheel wells covered by fender skirts. In these vehicles, the fender skirts covering the wheel wells join the fenders for the wheel wells as continuous parts of the body. Although configurations exist for reasons beyond aerodynamics, such as aesthetics, when fender skirts are employed to realize the improved aerodynamics promised by covering otherwise open wheel wells, they often join the fenders for the wheel wells inline as a continuous part of the body. The fender skirts, in other words, are inline fender skirts.

To the extent vehicles employ inline fender skirts, their steered wheels will typically still be accommodated in open wheel wells. This is because the steered wheels, during steering events, occupy swept volumes passing beyond their wheel wells, and outside the body. These steering events would, accordingly, induce interference between the steered wheels and prospective inline fender skirts covering their wheel wells.

SUMMARY

Disclosed herein are embodiments of morphing fender skirts and vehicles with morphing fender skirts. In one aspect, a morphing fender skirt includes a rigid, open-ended arched base, stretchable exterior skin connected across the base, and a structural, bendable rib array connected over the base subjacent to the skin. The rib array is configured to bend between a flattened shape over the base, whereby the rib array imparts the flattened shape to the skin across the base, and a domed shape over the base, whereby the rib array imparts the domed shape to the skin across the base.

In another aspect, a vehicle includes a steered wheel, a wheel well accommodating the steered wheel, and a morphing fender skirt connected across the wheel well. The steered wheel occupies a swept volume during steering events that passes beyond the wheel well. The morphing fender skirt has an inline state, in which the morphing fender skirt has a flattened configuration across the wheel well, and an expanded state, in which the morphing fender skirt has a domed configuration across the wheel well and thereby vacates the swept volume. The morphing fender skirt includes stretchable exterior skin connected across the wheel well, and a structural, bendable rib array connected over the wheel well subjacent to the skin. The rib array is configured to bend between a flattened shape over the wheel well coextensive with the flattened configuration of the morphing fender skirt, whereby the rib array imparts the flattened shape to the skin across the wheel well, and a domed shape over the wheel well coextensive with the domed configuration of the morphing fender skirt, whereby the rib array imparts the domed shape to the skin across the wheel well.

In yet another aspect, a morphing fender skirt includes a rigid, open-ended arched base, and a rib array including a plurality of elongate, structural, bendable ribs. The ribs extend over the base in a converging relationship from respective circumferentially arranged connections with the base. Each rib is configured to laterally move away from the inside of the base as a product of bending about a single axis from a flattened shape to assume a bent shape, whereby the bent shapes of the ribs together establish a domed shape of the rib array over the base, and laterally return toward the inside of the base as a product of bending about the single axis from the bent shape to assume the flattened shape, whereby the flattened shapes of the ribs together establish a flattened shape of the rib array over the base.

These and other aspects will be described in additional detail below.

BRIEF DESCRIPTION OF THE DRAWINGS

The various features, advantages and other uses of the present embodiments will become more apparent by referring to the following detailed description and drawing in which.

DETAILED DESCRIPTION

This disclosure teaches a vehicle whose body includes a morphing fender skirt covering a wheel well that accommodates a steered wheel. In addition to an inline state, the morphing fender skirt has an expanded state, in which the morphing fender skirt has a domed configuration and thereby vacates a swept volume that the steered wheel occupies during steering events. The morphing fender skirt accordingly maintains the advantages of improved aerodynamics in the inline state, while eliminating, in the expanded state, the prospect of interference with the steered wheel during steering events.

The morphing fender skirt has both a stretchable exterior skin and a subjacent structural, bendable rib array. The rib array acts on the skin for purposes of driving the deployment of the morphing fender skirt between the inline state and the expanded state. With the skin, the morphing fender skirt maintains its side profile, for purposes of covering the wheel well, by undergoing progressive changes in exterior surface area. With the rib array, on the other hand, the morphing fender skirt features subjacent structure for a part of the vehicle's exterior formed by the skin, and manages strain to nonetheless maintain the ability to bend as needed in order to act on the skin.

Figure 1:
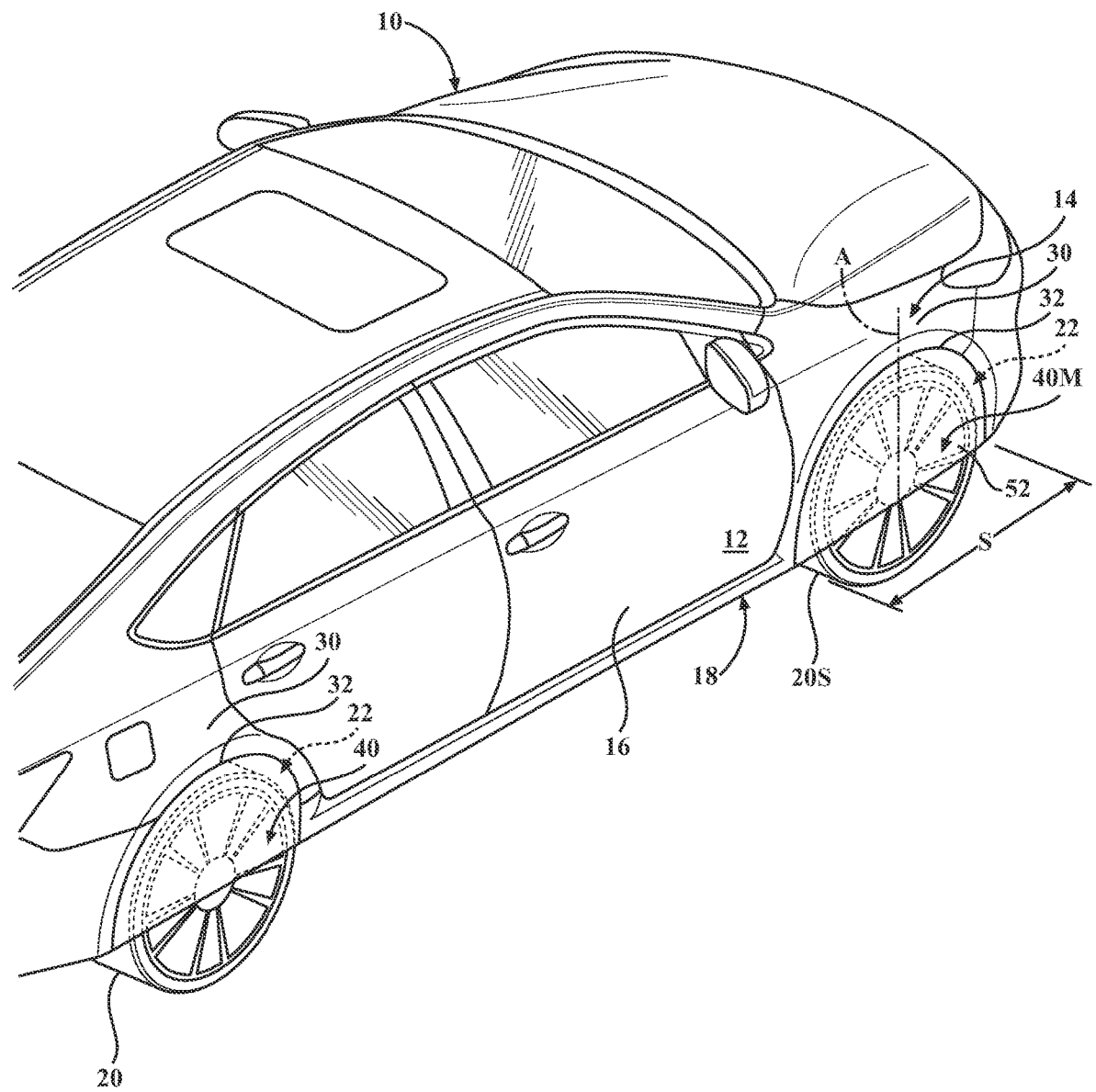
FIG. 1 is a perspective view of a vehicle that includes wheels, wheel wells accommodating the wheels and fender skirts covering the wheel wells, with each fender skirt shown in an inline state.

A representative vehicle 10 is shown in FIG. 1. In this description, uses of "front," "forward" and the like, and uses of "rear," "rearward" and the like, refer to the longitudinal direction of the vehicle 10. "Front," "forward" and the like refer to the front (fore) of the vehicle 10, while "rear," "rearward" and the like refer to the back (aft) of the vehicle 10. Uses of "side," "sideways," "transverse" and the like refer to the lateral direction of the vehicle 10, with "driver's side" and the like referring to the left side of the vehicle 10, and "passenger side" and the like referring to the right side of the vehicle 10.

The vehicle 10 has an exterior 12 and a number of inner compartments. The inner compartments include a passenger compartment, an engine compartment and, for the illustrated vehicle 10, a trunk. The vehicle 10 has a body 14 that forms the exterior 12 of the vehicle 10 and defines its inner compartments. The body 14 has upright sides 16 with doors, as well as a floor, a front end, a rear end, a roof and the like. In addition to the body 14, the vehicle 10 has an underbody 18.

The vehicle 10 may include, among other things, seats and a dash assembly housed in its passenger compartment. Additionally, the vehicle 10 may include an engine, motor, transmission and other powertrain components housed in its engine compartment or elsewhere in the vehicle 10.

Among these other powertrain components, the vehicle 10 includes wheels 20. The wheels 20 support the remainder of the vehicle 10 on the ground. The vehicle 10 includes four wheels 20, two of which are front wheels 20, and two of which are rear wheels 20. One passenger side front wheel 20 is shown, with the other, driver's side front wheel being a mirror image. Likewise, one passenger side rear wheel 20 is shown, with the other, driver's side wheel rear being a mirror image. One, some or all of the wheels 20 are powered by the remainder of the powertrain components to drive the vehicle 10 along the ground.

The vehicle 10 accommodates each wheel 20 in a respective wheel well 22. The wheel wells 22 are respective contiguous spaces that open from the underbody 18, where they are each framed by any combination of a floor structure for the floor of the body 14 and various underbody coverings. At the body 14, each wheel well 22 is framed by a respective fender 30. Generally speaking, the respective fenders 30 are respective associated areas of the body 14, at the upright sides 16, around the wheel wells 22. With respect to the body 14 to which they belong, the fenders 30 may but need not be rendered by dedicated body panels or other body components.

The vehicle 10 has an upright junction 32 between each wheel well 22 and the fender 30 for the wheel well 22. The junctions 32 have open-ended arched configurations. The vehicle 10 may, for instance, have any combination of semi-circumferential, U-shaped, C-shaped or otherwise open-ended arched junctions 32 between the wheel wells 22 and the respective fenders 30 for the wheel wells 22. With these and other open-ended arched configurations, each junction 32 has span S, as well as an axis A intersecting the center of the span S.

In the vehicle 10, one, some or all of the wheel wells 22, although opening from the underbody 18, do not open from the body 14. These wheel wells 22, in other words, are not open wheel wells. Instead, the vehicle 10 includes respective fender skirts 40 that cover the otherwise open wheel wells 22. To cover a wheel well 22, each fender skirt 40 is connected across the wheel well 22 at or otherwise around the junction 32 between the wheel well 22 and the fender 30 framing the wheel well 22. Each fender skirt 40 then joins the fender 30 as a continuous part of the body 14.

As shown in FIG. 1, the fender skirts 40 have inline states. In the inline state, each fender skirt 40, similarly to an inline fender skirt, joins the fender 30 for the wheel well 22 that the fender skirt 40 covers inline as a continuous part of the body 14.

In the inline states, the fender skirts 40 are advantageous for realizing improved aerodynamics. When the vehicle 10 is driven along the ground, free airflow is induced across the body 14 as a result of relative movement between the vehicle 10 and surrounding ambient air. In forward operation, much if not all of this free airflow is rearward and, accordingly, oncoming to the vehicle 10. The wheel wells 22, if they were open wheel wells, would have the tendency to redirect, deflect or otherwise change the motion of this free oncoming airflow over either their respective fenders 30 or the remainder of the body 14, or both. This would contribute to the aerodynamic drag on the vehicle 10. However, in the inline states, the respective fender skirts 40 for the wheel wells 22 streamline the body 14 over the wheel wells 22. This eliminates or otherwise reduces the contribution the wheel wells 22 would make, if they were open wheel wells, to the aerodynamic drag on the vehicle 10.

Figure 2A:
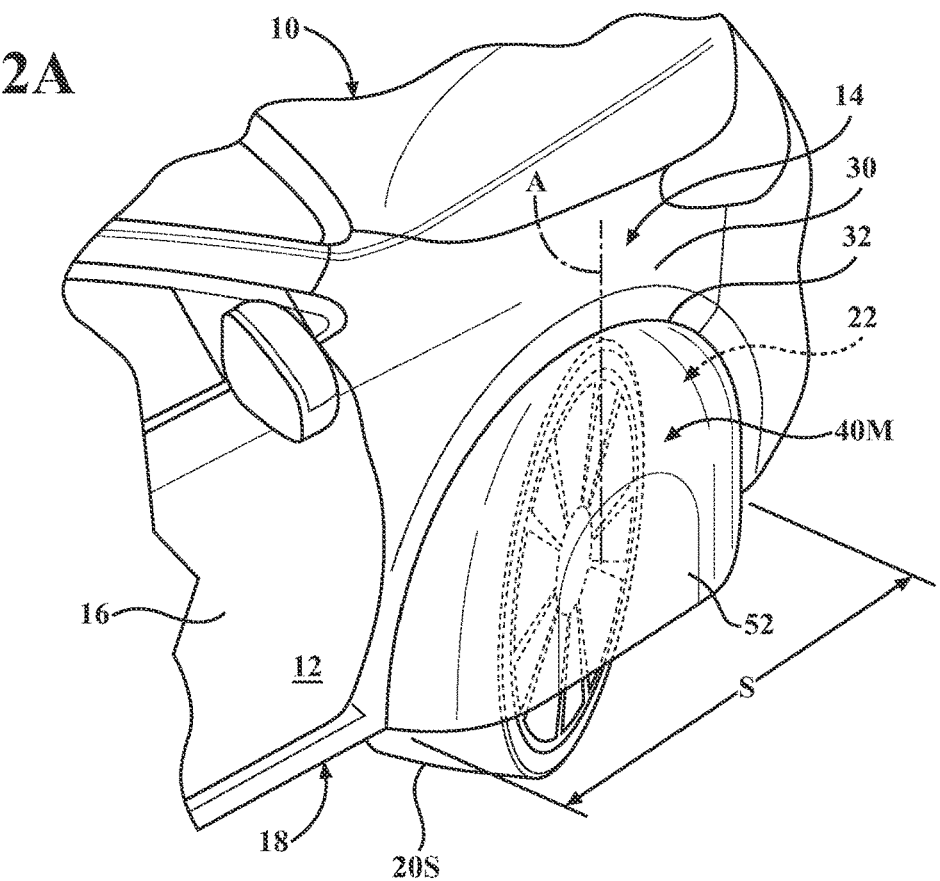
FIGS. 2A and 2B are detailed perspective views of the vehicle as a steered wheel occupies a swept volume during steering events, with the fender skirt for the wheel well accommodating the steered wheel being a morphing fender skirt shown deployed from the inline state to an expanded state to vacate the swept volume.
Figure 2B:
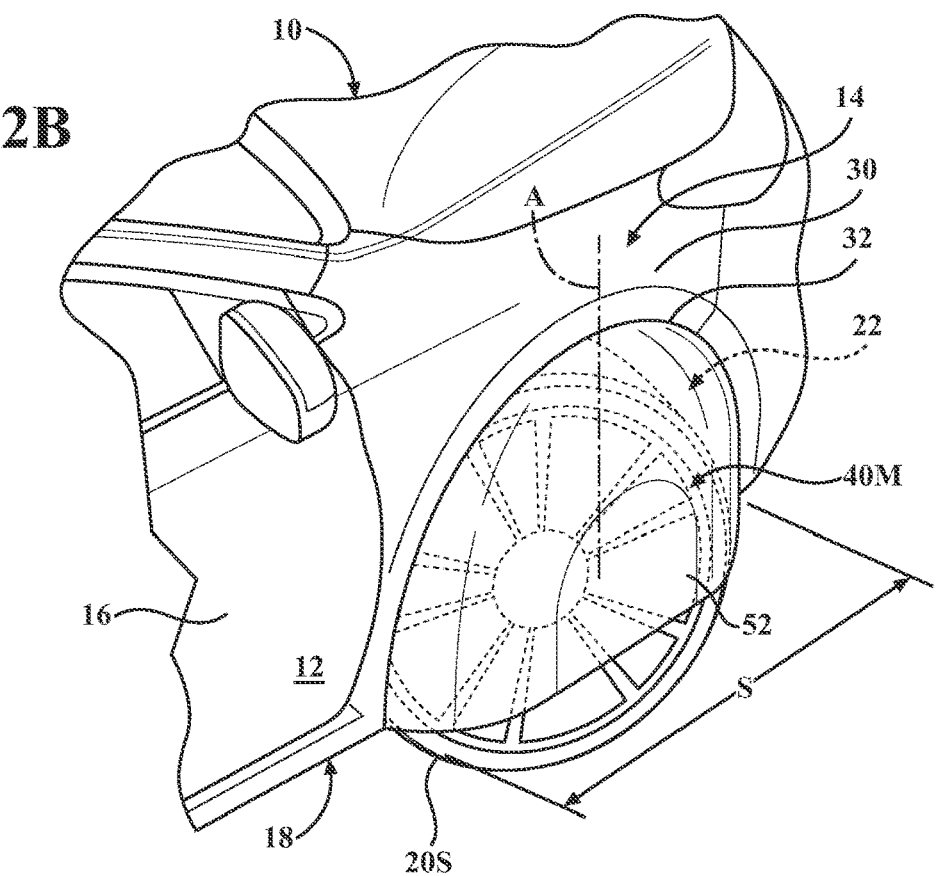

As shown with additional reference to FIGS. 2A and 2B, and as represented by the passenger side front wheel 20, the two front wheels 20 of the vehicle 10 are steered wheels 20S. During steering events, the steered wheels 20S are subject to having their steering angles adjusted. This adjusts the orientation of the vehicle 10 as it is driven along the ground. The steered wheels 20S, as accommodated in their respective wheel wells 22, normally remain inside the body 14. However, during the steering events, the steered wheels 20S occupy swept volumes passing beyond their respective wheel wells 22, and outside the body 14.

In the vehicle 10, each fender skirt 40 for the wheel well 22 accommodating a steered wheel 20S is a morphing fender skirt 40M. In addition to the inline state represented in FIG. 1, each morphing fender skirt 40M has an expanded state during steering events, as represented in FIGS. 2A and 2B.

In the inline state, each morphing fender skirt 40M occupies the swept volume of the steered wheel 20S accommodated in the wheel well 22 that the morphing fender skirt 40M covers. This is because, as noted above for the fender skirts 40 generally, in the inline state, each morphing fender skirt 40M joins the fender 30 for the wheel well 22 that the morphing fender skirt 40M covers inline as a continuous part of the body 14. In the expanded state, on the other hand, each morphing fender skirt 40M is laterally expanded outside the surrounding body 14 to vacate the swept volume of the steered wheel 20S accommodated in the wheel well 22 that the morphing fender skirt 40M covers. Each morphing fender skirt 40M accordingly maintains the advantages of improved aerodynamics in the inline state, while eliminating, in the expanded state, the prospect of interference with the steered wheel 20S during steering events.

For brevity, this description follows with reference to the morphing fender skirt 40M for the wheel well 22 accommodating the representative passenger side front steered wheel 20S. By extension, this description follows with reference to the junction 32 between this wheel well 22 and the fender 30 framing it. However, it will be understood that this disclosure is applicable in principle to respective morphing fender skirts 40M for other wheel wells 22 similarly accommodating a steered wheel 20S, including but not limited to the driver's side front steered wheel 20S.

Figure 3A:
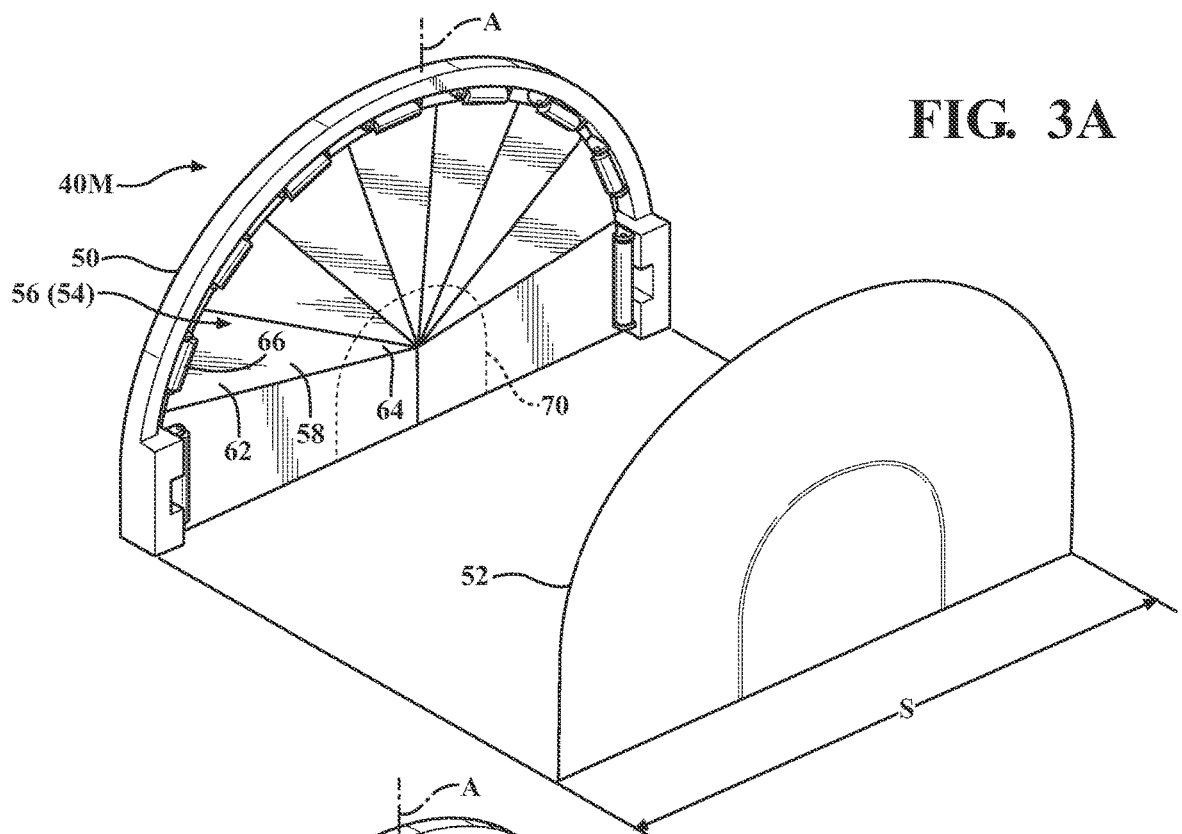
FIGS. 3A and 3B are partially exploded views of the morphing fender skirt in the inline state and the expanded state, respectively, showing a rigid base, stretchable exterior skin and a deployment system, with the deployment system including one implementation of a bendable rib array that acts on the skin under the operation of the remainder of the deployment system to drive the deployment of the morphing fender skirt between the inline state and the expanded state.
Figure 3B:
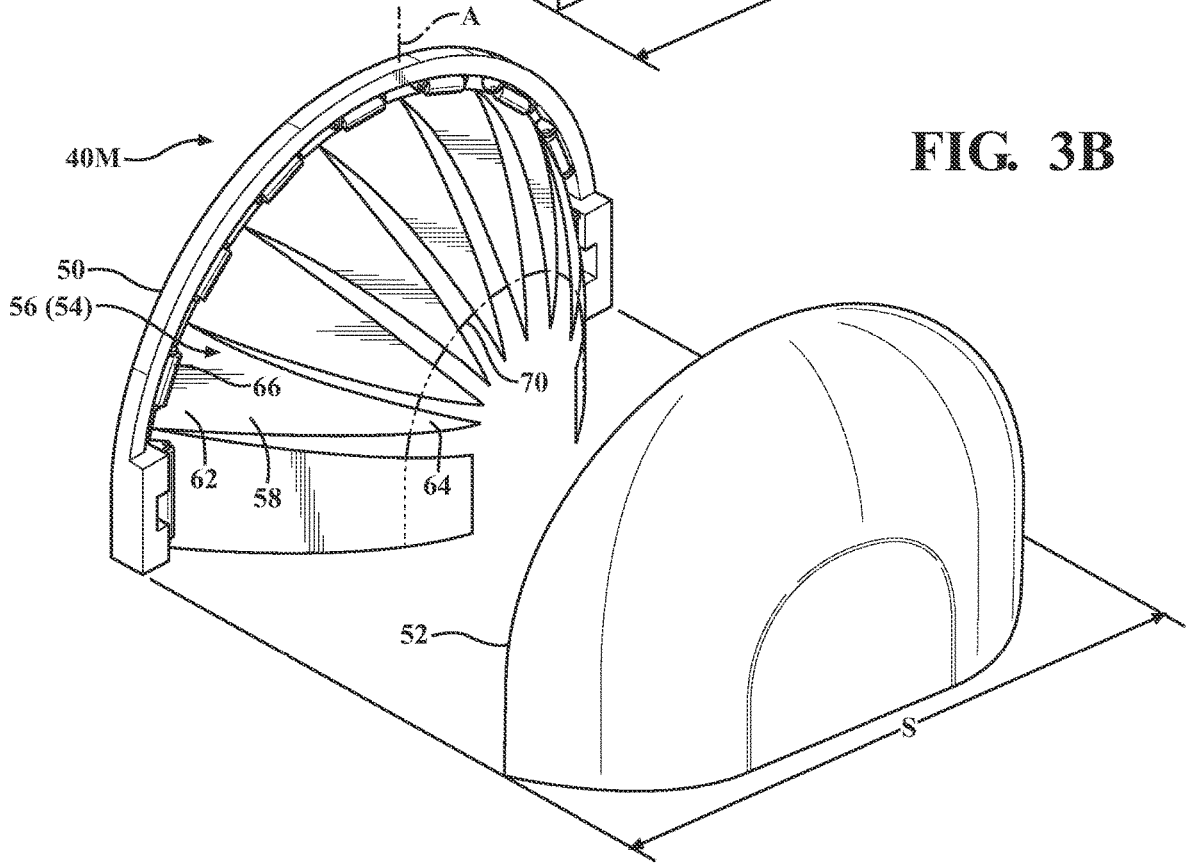

As shown with additional reference to FIGS. 3A and 3B, the morphing fender skirt 40M is configured for deployment between the inline state represented in FIG. 3A, and the expanded state represented in FIG. 3B. In the inline state, the morphing fender skirt 40M has a planar or otherwise flattened configuration across the wheel well 22. In the expanded state, on the other hand, the morphing fender skirt 40M has a domed configuration across the wheel well 22. Generally speaking, the flattened configuration of the morphing fender skirt 40M has a flat inside and a flat outside, while the domed configuration of the morphing fender skirt 40M has a concave inside and a convex outside.

During its deployment between the inline state and the expanded state, the morphing fender skirt 40M is configured to progressively change shape, or morph, between the flattened configuration and the domed configuration. Specifically, with its deployment from the inline state to the expanded state, the morphing fender skirt 40M morphs from the flattened configuration to assume the domed configuration. Similarly, with its deployment from the expanded state to the inline state, the morphing fender skirt 40M morphs from the domed configuration to assume the flattened configuration.

The morphing fender skirt 40M covers the wheel well 22. As noted above for the fender skirts 40 generally, the morphing fender skirt 40M does this by connecting across the wheel well 22 around the junction 32, and joining the fender 30 as a continuous part of the body 14. With the open-ended arched configuration of the junction 32, the morphing fender skirt 40M has a side profile with a closed-ended arched configuration. With these and other side profiles with closed-ended arched configurations associated with the open-ended arched junction 32, the morphing fender skirt 40M, in the side profile, shares the span S and the axis A.

With its connection across the wheel well 22 around the junction 32, the morphing fender skirt 40M maintains its side profile in both the inline state and the expanded state. During its deployment between the inline state and the expanded state, the morphing fender skirt 40M is configured to undergo the requisite progressive changes in exterior surface area as it morphs between the flattened configuration and the domed configuration. Specifically, with its deployment from the inline state to the expanded state, the morphing fender skirt 40M undergoes a progressive increase in exterior surface area as it morphs from the flattened configuration to assume the domed configuration. Similarly, with its deployment from the expanded state to the inline state, the morphing fender skirt 40M undergoes a progressive decrease in exterior surface area as it morphs from the domed configuration to assume the flattened configuration.

The morphing fender skirt 40M includes an upright rigid, structural base 50, stretchable exterior skin 52 and, as part of a deployment system 54, a structural, bendable rib array 56 with arrayed structural, bendable ribs 58. The skin 52 and the rib array 56 are connected to and over the base 50. The base 50, in turn, serves to connect the remainder of the morphing fender skirt 40M, including the skin 52 and the rib array 56, to the remainder of the vehicle 10.

As noted above, the base 50 serves to connect the morphing fender skirt 40M to the remainder of the vehicle 10. The base 50, more specifically, is connected around the junction 32 between the wheel well 22 and the fender 30. For this purpose, the base 50 has an open-ended arched configuration corresponding to the open-ended arched configuration of the junction 32. Accordingly, the morphing fender skirt 40M may, for instance, have a semi-circumferential, U-shaped, C-shaped or otherwise open-ended arched base 50. With these and other open-ended arched configurations corresponding to the open-ended arched junction 32, the base 50 shares the span S and the axis A. The base 50 is represented as being rendered by a dedicated body component. The base 50 could alternatively or additionally be rendered by the surrounding body 14 (e.g., the wheel well 22, the fender 30, etc.) of the vehicle 10. The base 50 could also alternatively or additionally be rendered by any combination of different or additional dedicated body components.

As further noted above, both the skin 52 and the rib array 56 are connected over the base 50. The skin 52, more specifically, is connected across (i.e., to span the inside of) the base 50. With this connection, and the connection of the base 50 around the junction 32 between the wheel well 22 and the fender 30, the skin 52 is connected across the wheel well 22 around the junction 32, and joins the fender 30 as a continuous part of the body 14. The skin 52, accordingly, serves to cover the wheel well 22 on behalf of the morphing fender skirt 40M to which the skin 52 belongs.

The rib array 56 is similarly connected over (i.e., to extend over the inside of) the base 50 subjacent to the skin 52. With this connection, and the connection of the base 50 around the junction 32 between the wheel well 22 and the fender 30, the rib array 56 is connected over the wheel well 22 around the junction 32. To drive the deployment of the morphing fender skirt 40M between the inline state and the expanded state, the rib array 56 acts on the skin 52 under the operation of the remainder of the deployment system 54.

With the open-ended arched configuration of the base 50, the skin 52, with its connection across the base 50, has a side profile with a closed-ended arched configuration. The side profile of the skin 52 defines the side profile of the morphing fender skirt 40M to which the skin 52 belongs. The side profile of the skin 52 further establishes the footprint of the rib array 56. Accordingly, both the side profile of the morphing fender skirt 40M and the footprint of the rib array 56 correspond to the side profile of the skin 52. With the open-ended arched configuration of the base 50, the skin 52 may, for instance, have a semi-circular, closed U-shaped, closed C-shaped or otherwise closed-ended arched side profile, to which both the closed-ended arched side profile of the morphing fender skirt 40M and a closed-ended arched footprint of the rib array 56 correspond. With these and other side profiles with closed-ended arched configurations associated with the open-ended arched base 50, the skin 52, in the side profile, shares the span S and the axis A. Both the side profile of the morphing fender skirt 40M and the footprint of the rib array 56 also share the span S and the axis A.

During its deployment between the inline state and the expanded state, the morphing fender skirt 40M morphs between the flattened configuration across the wheel well 22, in the inline state, and the domed configuration across the wheel well 22, in the expanded state. This deployment is driven by the rib array 56 acting on the skin 52. In the inline state, the rib array 56 has a planar or otherwise flattened shape over the base 50, and acts on the skin 52 to impart the flattened shape to the skin 52 across the base 50. The imparted flattened shape of the skin 52 across the base 50 accordingly corresponds to the flattened shape of the rib array 56 over the base 50. In the expanded state, on the other hand, the rib array 56 has a domed shape over the base 50, and acts on the skin 52 to impart the domed shape to the skin 52 across the base 50. The imparted domed shape of the skin 52 across the base 50 accordingly corresponds to the domed shape of the rib array 56 over the base 50. Generally speaking, both the flattened shape of the rib array 56 and the imparted flattened shape of the skin 52 have a flat inside and a flat outside, while both the domed shape of the rib array 56 and the imparted domed shape of the skin 52 have a concave inside and a convex outside.

In the inline state, the flattened shape of the rib array 56 and the imparted flattened shape of the skin 52 together establish the flattened configuration of the morphing fender skirt 40M to which they belong. Accordingly, the flattened configuration of the morphing fender skirt 40M corresponds to the collective flattened shape of the rib array 56 and imparted flattened shape of the skin 52. Contrariwise, both the flattened shape of the rib array 56 and the imparted flattened shape of the skin 52 are coextensive with the flattened configuration of the morphing fender skirt 40M. Further, both the rib array 56 and the skin 52 occupy the inside of the base 50 and, in the vehicle 10, the swept volume of the steered wheel 20S accommodated in the wheel well 22.

Similarly, in the expanded state, the domed shape of the rib array 56 and the imparted domed shape of the skin 52 together establish the domed configuration of the morphing fender skirt 40M to which they belong. Accordingly, the domed configuration of the morphing fender skirt 40M corresponds to the collective domed shape of the rib array 56 and imparted domed shape of the skin 52. Contrariwise, both the domed shape of the rib array 56 and the imparted domed shape of the skin 52 are coextensive with the domed configuration of the morphing fender skirt 40M. Further, both the rib array 56 and the skin 52 are laterally expanded away from the inside of the base 50 and, in the vehicle 10, outside the surrounding body 14 to vacate the swept volume of the steered wheel 20S accommodated in the wheel well 22.

For purposes of driving the deployment of the morphing fender skirt 40M between the inline state and the expanded state, the rib array 56 is configured to progressively elastically deform, or bend, between the flattened shape and the domed shape. Specifically, to drive the deployment of the morphing fender skirt 40M from the inline state to the expanded state, the rib array 56 is bent from the flattened shape to assume the domed shape. As a product of this bending action, the rib array 56 is laterally expanded away from the inside of the base 50. Similarly, to drive the deployment of the morphing fender skirt 40M from the expanded state to the inline state, the rib array 56 is bent from the domed shape to assume the flattened shape. As a product of this bending action, the rib array 56 is laterally returned toward the inside of the base 50.

As the rib array 56 is bent between the flattened shape and the domed shape, the rib array 56 acts on the skin 52 to impart the flattened shape or the domed shape, as the case may be, to the skin 52. The skin 52, as part of the deployment of the morphing fender skirt 40M between the inline state and the expanded state, is configured to stretch between the imparted flattened shape and the imparted domed shape. Specifically, as the rib array 56 is bent from the flattened shape to assume the domed shape, the rib array 56 forcibly acts on the skin 52, and the skin 52 is positively stretched (i.e., progressively elastically expanded to a more stretched condition) from the imparted flattened shape to assume the imparted domed shape. As a product of this stretching action, the skin 52 is laterally expanded away from the inside of the base 50. Similarly, as the rib array 56 is bent from the domed shape to assume the flattened shape, the rib array 56 withdrawably acts on the skin 52, and the skin 52 is relaxingly stretched (i.e., progressively elastically contracted to a less stretched condition) from the imparted domed shape to assume the imparted flattened shape. As a product of this stretching action, the skin 52 is laterally returned toward the inside of the base 50. In one implementation, the skin 52, under its connection across the base 50, maintains a stretched condition in both the inline state and the expanded state. In this implementation, the rib array 56 may withdrawably act on the skin 52 by permitting the skin 52 to relaxingly stretch on its own from the imparted domed shape to assume the imparted flattened shape.

At the same time, with its connection across the base 50, the skin 52 maintains its side profile and, by extension, the corresponding side profile of the morphing fender skirt 40M to which the skin 52 belongs, in both the inline state and the expanded state. With its ability to stretch, the skin 52 is configured to undergo progressive changes in exterior surface area, on behalf of the morphing fender skirt 40M to which the skin 52 belongs, as it stretches between the imparted flattened shape and the imparted domed shape. Specifically, the skin 52 undergoes a progressive increase in exterior surface area, on behalf of the morphing fender skirt 40M to which the skin 52 belongs, as it stretches from the imparted flattened shape to assume the imparted domed shape. Similarly, the skin 52 undergoes a progressive decrease in exterior surface area, on behalf of the morphing fender skirt 40M to which the skin 52 belongs, as it stretches from the imparted domed shape to assume the imparted flattened shape.

The skin 52 may be unconnected from the rib array 56 and its ribs 58, or point or contiguously connected (e.g., using bonding techniques) to the rib array 56 and its ribs 58. The skin 52 is configured for sliding or other moving contact with any unconnected portions of the rib array 56 and its ribs 58 as the rib array 56 acts on the skin 52 to impart the flattened shape or the domed shape, as the case may be, to the skin 52.

With the closed-ended arched side profile of the skin 52, in the inline state, the collective flattened shape of the rib array 56 and imparted flattened shape of the skin 52, as well as the corresponding flattened configuration of the morphing fender skirt 40M, may, for instance, have mutually corresponding semi-circular, closed U-shaped, closed C-shaped or otherwise flattened arched shapes. In the expanded state, on the other hand, the collective domed shape of the rib array 56 and imparted domed shape of the skin 52, as well as the corresponding domed configuration of the morphing fender skirt 40M, may, for instance, have mutually corresponding quarter-spherical, domed U-shaped, domed C-shaped or otherwise domed arched shapes.

The skin 52 may be made from any combination of durable but stretchable materials or other structures suitable for serving as part of the body 14 of the vehicle 10 and forming part of the exterior 12 thereof. The skin 52 may, for instance, be made in whole or in part from spandex material. The rib array 56 and its ribs 58 may be made from any combination of bendable materials or other structures suitable for serving as both part of the body 14 and as subjacent structure for the part of the exterior 12 formed by the skin 52. The rib array 56 and its ribs 58 may, for instance, be made in whole or in part from plastic material.

Both the skin 52 and the rib array 56 are flexible and resilient and, together, functionally support the deployment of the morphing fender skirt 40M between the inline state and the expanded state. During this deployment, the skin 52 and the rib array 56 each individually satisfy sometimes conflicting functional requirements of the morphing fender skirt 40M to which they belong. The skin 52, for instance, with its ability to stretch between the imparted flattened shape in the inline state and the imparted domed shape in the expanded state, satisfies the requirement of maintaining its side profile, for purposes of covering the wheel well 22, by undergoing progressive changes in exterior surface area. The rib array 56 and similar structural items would have difficulty satisfying this requirement due to the strain inherent in these progressive changes in exterior surface area, particularly across the bottom of the morphing fender skirt 40M, where the most strain is experienced. The skin 52 and similar stretchable items, on the other hand, would have difficulty satisfying the requirement of serving as subjacent structure for the part of the exterior 12 of the vehicle 10 formed by the skin 52. The rib array 56, however, satisfies this requirement, while nonetheless maintaining the ability to bend between the flattened shape in the inline state and the domed shape in the expanded state, by using the ribs 58 to manage strain.

Each rib 58, like the rib array 56 to which it belongs, is connected to and over the base 50 subjacent to the skin 52. More specifically, the ribs 58 are connected to the base 50, and extend from their respective connections with the base 50 over the inside of the base 50. In the inline state, each rib 58 has a planar or otherwise flattened shape over the base 50, and individually acts on the skin 52 to impart the flattened shape to the skin 52 across the base 50. In the expanded state, on the other hand, each rib 58 has a bent shape over the base 50, and individually acts on the skin 52 to impart the bent shape to the skin 52 across the base 50. Generally speaking, the flattened shapes of the ribs 58 have respective flat insides and flat outsides, while the bent shapes of the ribs 58 have respective concave insides and convex outsides.

In the inline state, the flattened shapes of the ribs 58 together establish the flattened shape of the rib array 56 to which the ribs 58 belong. Accordingly, the flattened shape of the rib array 56 corresponds to the collective flattened shapes of the ribs 58. Contrariwise, the flattened shape of each rib 58 is coextensive with the flattened shape of the rib array 56. Further, each rib 58 occupies the inside of the base 50 and, in the vehicle 10, the swept volume of the steered wheel 20S accommodated in the wheel well 22.

Similarly, in the expanded state, the bent shapes of the ribs 58 together establish the domed shape of the rib array 56 to which the ribs 58 belong. Accordingly, the domed shape of the rib array 56 corresponds to the collective bent shapes of the ribs 58. Contrariwise, the bent shape of each rib 58 is coextensive with the domed shape of the rib array 56. Further, each rib 58 is laterally moved away from the inside of the base 50 and, in the vehicle 10, outside the surrounding body 14 to vacate the swept volume of the steered wheel 20S accommodated in the wheel well 22.

With the open-ended arched configuration of the base 50, the ribs 58 are arrayed in a radial arrangement in the rib array 56 to which the ribs 58 belong. In the radial arrangement, each rib 58 is elongate, and has a proximal end 62 and an opposing distal end 64. The base 50 has respective circumferentially arranged hinges 66 for the ribs 58. The ribs 58 are hingeably connected to the base 50, at their proximal ends 62, by the respective hinges 66, and are pivotable about their respective hinged connections with the base 50. The respective hinges 66 are represented as being rendered by respective knuckle interfaces between the base 50 and separately made ribs 58. Alternatively, the ribs 58 could be made as a unitary whole with the base 50, and the respective hinges 66 could be rendered by respective living hinges, creases, necks or other flexural interfaces therein between the base 50 and the ribs 58. The ribs 58 extend from their respective hinged connections with the base 50 in a converging relationship. More specifically, the ribs 58 extend from their respective hinged connections with the base 50 toward a common central area along the axis A where their distal ends 64 meet.

The proximal ends 62 of the ribs 58 form a closed loop at their respective hinged connections with the base 50. Moreover, each rib 58 has a pie-shaped or otherwise petal-shaped side profile. As a result, the ribs 58 are arranged side-to-side. The bottommost ribs 58 extending over the inside of the bottom of the base 50, where the most strain is experienced by the skin 52 on behalf of the morphing fender skirt 40M to which the skin 52 belongs, form greater-than-equal parts of the rib array 56. Alternatively, each rib 58 could have a pie-shaped side profile in the flattened shape, and form an equal part of the rib array 56.

For purposes of driving the deployment of the morphing fender skirt 40M between the inline state and the expanded state, each rib 58 is configured to bend between the flattened shape and the bent shape. Moreover, each rib 58 is configured to laterally pivot about its hinged connection with the base 50 between the inside of the base 50 and beyond the inside of the base 50.

Specifically, to drive the deployment of the morphing fender skirt 40M from the inline state to the expanded state, each rib 58 is concurrently bent from the flattened shape to assume the bent shape and laterally pivoted away from the inside of the base 50. As a product of this combined bending and pivoting action, each rib 58 is laterally moved away from the inside of the base 50. At the same time, the distal ends 64 of the ribs 58 are drawn toward their respective hinged connections with the base 50, and away from one another. The rib array 56 to which the ribs 58 belong is correspondingly bent from the flattened shape thereof to assume the domed shape thereof, and is resultantly laterally expanded away from the inside of the base 50.

Similarly, to drive the deployment of the morphing fender skirt 40M from the expanded state to the inline state, each rib 58 is concurrently bent from the bent shape to assume the flattened shape and laterally pivoted toward the inside of the base 50. As a product of this combined bending and pivoting action, each rib 58 is laterally returned toward the inside of the base 50. At the same time, the distal ends 64 of the ribs 58 are drawn away from their respective hinged connections with the base 50, and toward one another. The rib array 56 to which the ribs 58 belong is correspondingly bent from the domed shape thereof to assume the flattened shape thereof, and is resultantly laterally returned toward the inside of the base 50.

The rib array 56 includes a stretchable band 70 interconnecting the distal ends 64 of the ribs 58. The band 70 coordinates the drawing of the distal ends 64 of the ribs 58 away from one another as each rib 58 is laterally moved away from the inside of the base 50, and toward one another as each rib 58 is laterally returned toward the inside of the base 50. By extension, the band 70 coordinates the underlying combined bending of the ribs 58 between the flattened shapes and the bent shapes and lateral pivoting of the ribs 58 between the inside of the base 50 and beyond the inside of the base 50. By further extension, the band 70 coordinates the underlying remainder of the deployment of the morphing fender skirt 40M between the inline state and the expanded state. The band 70 is represented as being rendered by a dedicated component. With the skin 52 being stretchable, the band 70 could alternatively or additionally be rendered by respective point connections (e.g., using bonding techniques) between the skin 52 and the distal ends 64 of the ribs 58.

Each rib 58 is in prestressed equilibrium, or otherwise configured to stably hold itself, in one or both of the flattened shape and the bent shape. Each rib 58, in other words, has one or both of a stable flattened shape and a stable bent shape. Accordingly, the rib array 56 to which the ribs 58 belong has one or both of a stable flattened shape corresponding to the collective stable flattened shapes of the ribs 58 and a stable domed shape corresponding to the collective stable bent shapes of the ribs 58. In cases where each rib 58 has both a stable flattened shape and a stable bent shape or, in other words, is bistable between the flattened shape and the bent shape, the rib array 56 to which the ribs 58 belong has both a stable flattened shape corresponding to the collective stable flattened shapes of the ribs 58 and a stable domed shape corresponding to the collective stable bent shapes of the ribs 58 or, in other words, is bistable between the flattened shape and the domed shape.

As opposed to the imparted flattened shape and the imparted domed shape of the skin 52, which respectively correspond to the flattened shape and the domed shape of the rib array 56 and, by extension, to the collective flattened shapes and bent shapes of the ribs 58, neither the flattened shapes nor the bent shapes of the ribs 58 are the product of stretching. Moreover, as opposed to the flattened shape and the domed shape of the rib array 56, the flattened shapes and the bent shapes of the ribs 58 are the product of bending about a single axis. Accordingly, although the flattened shapes and the bent shapes of the ribs 58 together respectively establish the flattened shape and the domed shape of the rib array 56, and the ribs 58 together act on the skin 52 to impart the flattened shape and the domed shape to the skin 52, each rib 58 is subject to manageable strain as it bends between the flattened shape and the bent shape.

For purposes of serving as subjacent structure for the part of the exterior 12 of the vehicle 10 formed by the skin 52, one or both of the flattened shape of the rib array 56, in the inline state, and the domed shape of the rib array 56, in the expanded state, is contiguous. In cases where the flattened shape of the rib array 56 is contiguous, the flattened shapes of the ribs 58 are collaboratively sized and shaped to together establish the contiguous flattened shape of the rib array 56 to which the ribs 58 belong. Similarly, in cases where the domed shape of the rib array 56 is contiguous, the bent shapes of the ribs 58 are collaboratively sized and shaped to together establish the contiguous domed shape of the rib array 56 to which the ribs 58 belong.

As shown in FIG. 3A, in one implementation, the flattened shape of the rib array 56 is contiguous, and does not feature overlap between the ribs 58. As shown in FIG. 3B, once each rib 58 is laterally moved away from the inside of the base 50 to drive the deployment of the morphing fender skirt 40M from the inline state to the expanded state, the domed shape of the rib array 56 features gaps between the sides and distal ends 64 of the ribs 58. Accordingly, the domed shape of the rib array 56 is noncontiguous.

Figure 4A:
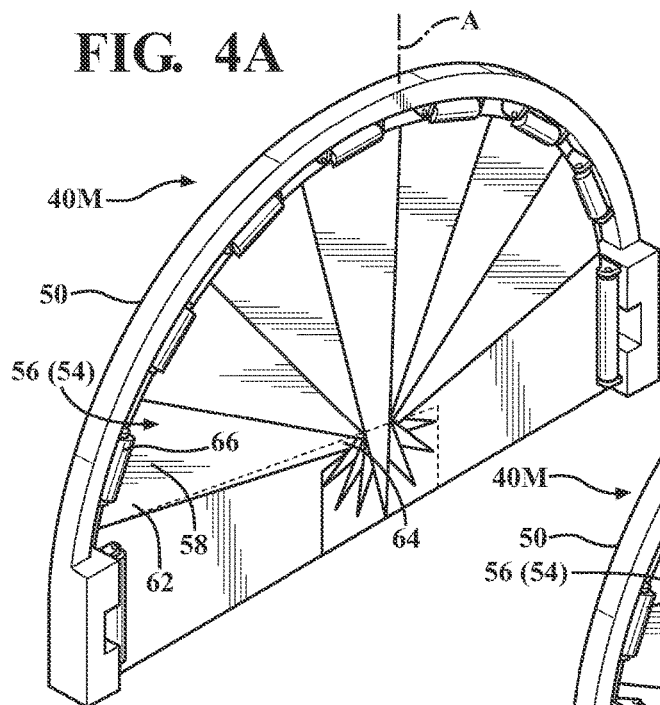
FIGS. 4A and 4B are partial views of the morphing fender skirt in the inline state and the expanded state, respectively, showing the deployment system including another implementation of the rib array.
Figure 4B:
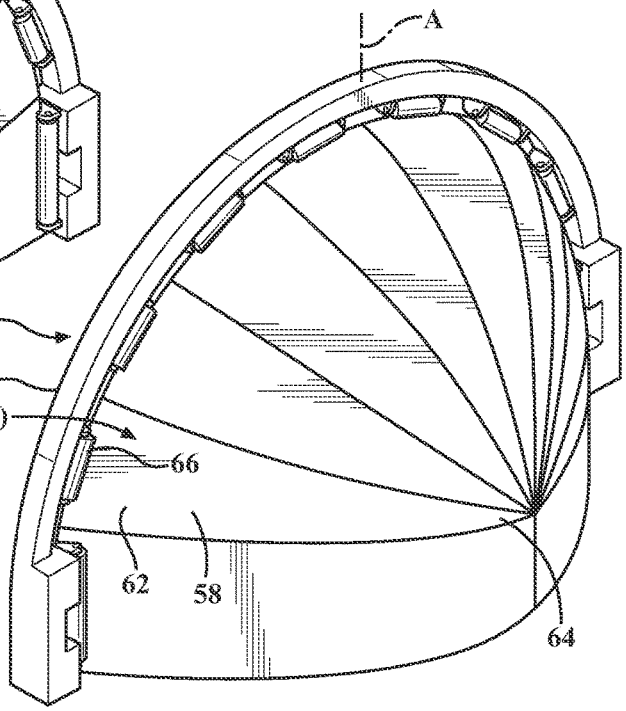
Figure 5A:
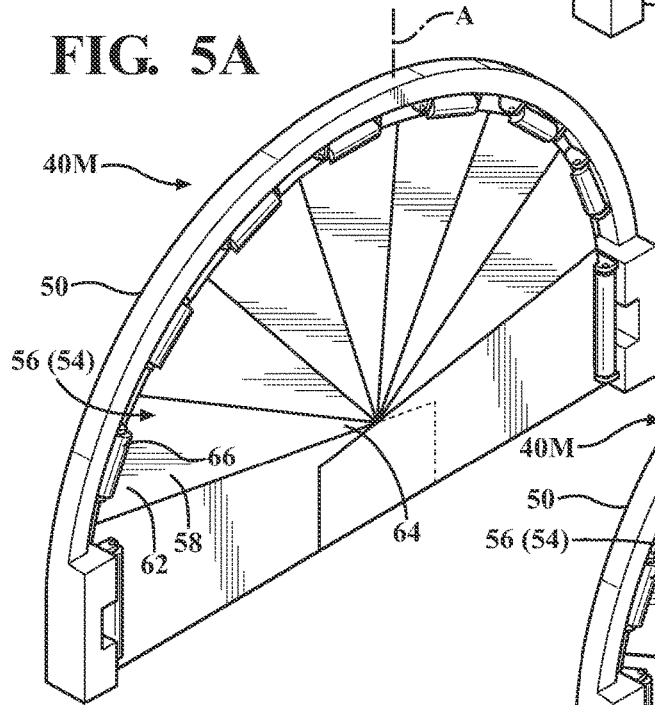
FIGS. 5A and 5B are partial views of the morphing fender skirt in the inline state and the expanded state, respectively, showing the deployment system including another implementation of the rib array.
Figure 5B:
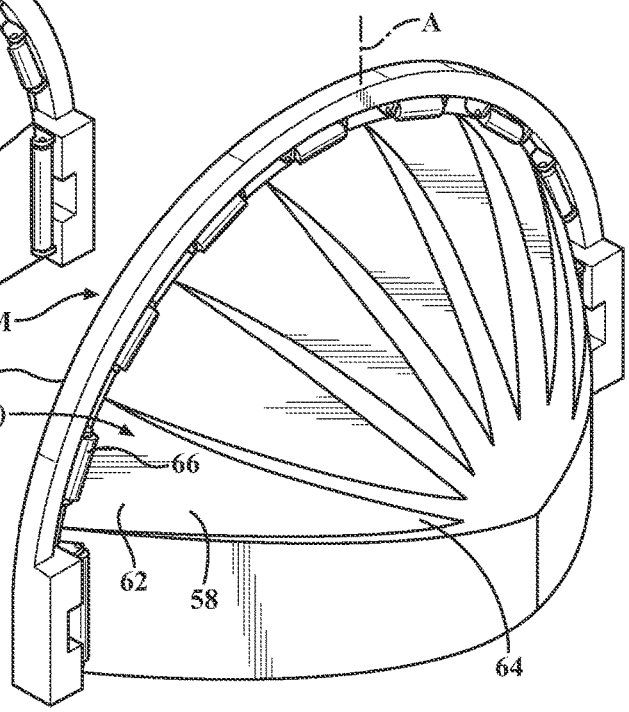

In other implementations, the flattened shape of the rib array 56 is contiguous, and does feature overlap between one, some or all of the ribs 58. For instance, as shown in FIG. 4A, the flattened shape of the rib array 56 features both side-to-side and distal end-to-distal end overlap between all of the ribs 58. As shown in FIG. 4B, once each rib 58 is laterally moved away from the inside of the base 50 to drive the deployment of the morphing fender skirt 40M from the inline state to the expanded state, the domed shape of the rib array 56 does not feature gaps between the sides and distal ends 64 of the ribs 58. Accordingly, the domed shape of the rib array 56 is contiguous. And, for instance, as shown in FIG. 5A, the flattened shape of the rib array 56 features selective distal end-to-distal end overlap between the bottommost ribs 58 extending over the inside of the bottom of the base 50. As shown in FIG. 5B, once each rib 58 is laterally moved away from the inside of the base 50 to drive the deployment of the morphing fender skirt 40M from the inline state to the expanded state, the domed shape of the rib array 56 does not feature gaps between the bottommost ribs 58. On the other hand, the domed shape of the rib array 56 does feature gaps between the sides and distal ends 64 of the remaining ribs 58. Accordingly, the domed shape of the rib array 56 is partly contiguous over the inside of the bottom of the base 50, but is otherwise noncontiguous.

As noted above, the morphing fender skirt 40M includes the rib array 56 as part of the deployment system 54. As shown with additional reference to FIGS. 6A, 6B, 7A and 7B, the remainder of the deployment system 54 besides the rib array 56 includes an actuator 80 coupled to the rib array 56 and its ribs 58. To drive the deployment of the morphing fender skirt 40M between the inline state and the expanded state, the actuator 80 is operable to act on the rib array 56 and its ribs 58 to induce the rib array 56 to bend between the flattened shape and the domed shape.

Specifically, to drive the deployment of the morphing fender skirt 40M from the inline state to the expanded state, the actuator 80 acts on each rib 58 to induce each rib 58 to concurrently bend from the flattened shape to assume the bent shape and laterally pivot away from the inside of the base 50. The actuator 80 correspondingly acts on the rib array 56 to which the ribs 58 belong to induce the rib array 56 to bend from the flattened shape thereof to assume the domed shape thereof. In cases where the ribs 58 have stable flattened shapes, the actuator 80 forcibly acts on the ribs 58 and the rib array 56 to which the ribs 58 belong. In cases where the ribs 58 do not have stable flattened shapes but have stable bent shapes, the actuator 80 withdrawably acts on the ribs 58 and the rib array 56 to which the ribs 58 belong.

Similarly, to drive the deployment of the morphing fender skirt 40M from the expanded state to the inline state, the actuator 80 acts on each rib 58 to induce each rib 58 to concurrently bend from the bent shape to assume the flattened shape and laterally pivot toward the inside of the base 50. The actuator 80 correspondingly acts on the rib array 56 to which the ribs 58 belong to induce the rib array 56 to bend from the domed shape thereof to assume the flattened shape thereof. In cases where the ribs 58 have stable bent shapes, the actuator 80 forcibly acts on the ribs 58 and the rib array 56 to which the ribs 58 belong. In cases where the ribs 58 do not have stable bent shapes but have stable flattened shapes, the actuator 80 withdrawably acts on the ribs 58 and the rib array 56 to which the ribs 58 belong.

Figure 6A:
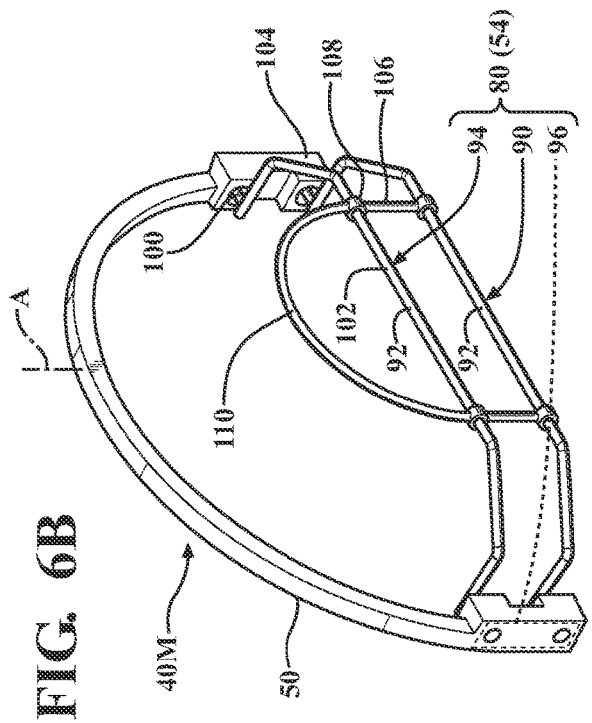
FIGS. 6A and 6B are partial views of the morphing fender skirt in the inline state and the expanded state, respectively, showing the deployment system including one implementation of an actuator coupled to the rib array and operable to act on the rib array to drive the deployment of the morphing fender skirt between the inline state and the expanded state.
Figure 6B:
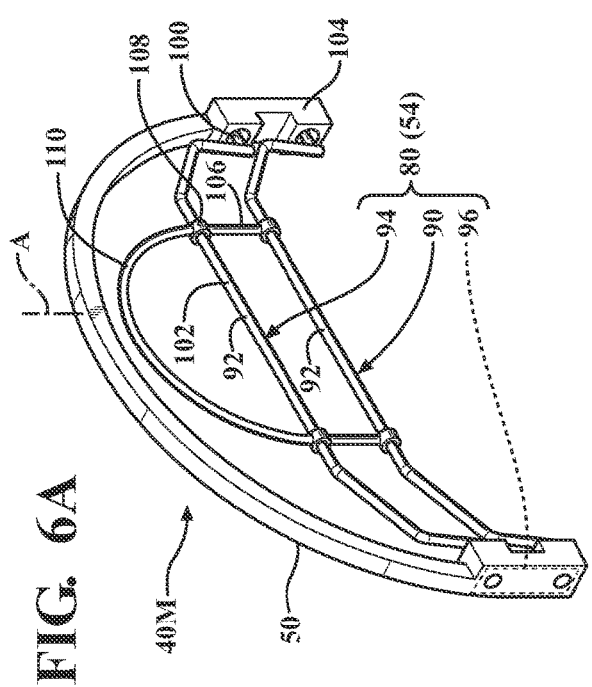

As shown in FIGS. 6A and 6B, in one implementation, the actuator 80 is a system that includes a crossbar mechanism 90 with one or more interlinked, parallel crossbars 92, an upright drive face 94, and a rotational drive motor 96 for the crossbar mechanism 90. The crossbar mechanism 90 is connected to and over the base 50, and supports the drive face 94. The drive motor 96 is housed in the base 50 and coupled between the base 50 and the crossbar mechanism 90.

Each crossbar 92 and, by extension, the crossbar mechanism 90 to which the crossbars 92 belong, are connected over the base 50 subjacent to the rib array 56 and its ribs 58. With this connection, and the connection of the base 50 around the junction 32 between the wheel well 22 and the fender 30, the crossbar mechanism 90 and its crossbars 92 are connected over the wheel well 22 around the junction 32. Each crossbar 92 is elongate, and has an open-ended arched configuration corresponding to a segment of the domed shape of the rib array 56. Each crossbar 92 has two opposing ends 100, and a crown 102. The base 50 has respective pairs of diametrically opposed joints 104 for the crossbars 92. The crossbars 92 are pivotally connected to the base 50, at their ends 100, by the respective pairs of joints 104, and are pivotable about their respective pivotal connections with the base 50. The crossbars 92 are interlinked at their crowns 102 by upright links 106. Each link 106 is pivotally connected between the crossbars 92 by respective joints 108 with the crossbars 92, and is pivotable about the crossbars 92 at each of its respective pivotal connections therewith. With this interlinking, the crossbars 92 are pivotable in unison about their respective pivotal connections with the base 50.

The crossbar mechanism 90 supports the drive face 94 upright (i.e., in a common orientation with the base 50) at the crowns 102 of its crossbars 92 over the base 50 subjacent to the rib array 56 and its ribs 58. The drive face 94 is configured for sliding, rolling (e.g., using rollers), tracked (e.g., using corresponding pins and slots) or other moving contact with the ribs 58 and the rib array 56 to which the ribs 58 belong. As noted above, crossbars 92 are interlinked at their crowns 102 with the links 106. The drive face 94 is represented as being rendered in part by the links 106, in part by an upright extension 110 from the links 106, and in part by the crowns 102 of the crossbars 92. The extension 110, similarly to the links 106 from which it extends, is pivotally connected to the crossbars 92 by the joints 108, and is pivotable about the crossbars 92 at each of its respective pivotal connections therewith. The drive face 94 could alternatively be rendered by a dedicated component.

As noted above, the crossbar mechanism 90 supports the drive face 94 upright. More specifically, the crossbar mechanism 90 continuously supports the drive face 94 upright as the crossbars 92 are pivoted about their respective pivotal connections with the base 50. As a result, the crossbar mechanism 90 supports the drive face 94 for reciprocating lateral movement between the inside of the base 50 and beyond the inside of the base 50. In the inline state, the crossbar mechanism 90 and its crossbars 92, as well as the drive face 94, are inline with the base 50, and the drive face 94 acts on the rib array 56 and its ribs 58 to induce the rib array 56 to assume the flattened shape over the base 50. Moreover, the crossbar mechanism 90 and its crossbars 92, as well as the drive face 94, correspond to the flattened shape of the rib array 56. Further, the crossbar mechanism 90 and its crossbars 92, as well as the drive face 94, occupy the inside of the base 50 and, in the vehicle 10, the swept volume of the steered wheel 20S accommodated in the wheel well 22. In the expanded state, on the other hand, the crossbar mechanism 90 and its crossbars 92 are normal to or otherwise extend away from the base 50, and the drive face 94 acts on the rib array 56 and its ribs 58 to induce the rib array 56 to assume the domed shape over the base 50. Moreover, the crossbar mechanism 90 and its crossbars 92, as well as the drive face 94, correspond to the domed shape of the rib array 56. Further, the crossbar mechanism 90 and its crossbars 92, as well as the drive face 94, are laterally moved away from the inside of the base 50 and, in the vehicle 10, outside the surrounding body 14 to vacate the swept volume of the steered wheel 20S accommodated in the wheel well 22.

The drive motor 96 is coupled to the crossbar mechanism 90 at the ends 100 of its crossbars 92. For purposes of driving the deployment of the morphing fender skirt 40M between the inline state and the expanded state, the drive motor 96 is operable to pivot the crossbars 92 about their respective pivotal connections with the base 50 between the inside of the base 50 and beyond the inside of the base 50.

Specifically, to drive the deployment of the morphing fender skirt 40M from the inline state to the expanded state, the drive motor 96 is operated to pivot the crossbars 92 away from the inside of the base 50. As a product of this powered pivoting action, the drive face 94 is laterally moved away from the inside of the base 50. As the drive face 94 is laterally moved away from the inside of the base 50, the drive face 94, on behalf of the actuator 80 to which the drive face 94 belongs, acts on each rib 58 to induce each rib 58 to concurrently bend from the flattened shape to assume the bent shape and laterally pivot away from the inside of the base 50. The drive face 94 correspondingly acts on the rib array 56 to which the ribs 58 belong to induce the rib array 56 to bend from the flattened shape thereof to assume the domed shape thereof.

Similarly, to drive the deployment of the morphing fender skirt 40M from the expanded state to the inline state, the drive motor 96 is operated to pivot the crossbars 92 toward the inside of the base 50. As a product of this powered pivoting action, the drive face 94 is laterally returned toward the inside of the base 50. As the drive face 94 is laterally returned toward the inside of the base 50, the drive face 94, on behalf of the actuator 80 to which the drive face 94 belongs, acts on each rib 58 to induce each rib 58 to concurrently bend from the bent shape to assume the flattened shape and laterally pivot toward the inside of the base 50. The drive face 94 correspondingly acts on the rib array 56 to which the ribs 58 belong to induce the rib array 56 to bend from the domed shape thereof to assume the flattened shape thereof.

Figure 7A:
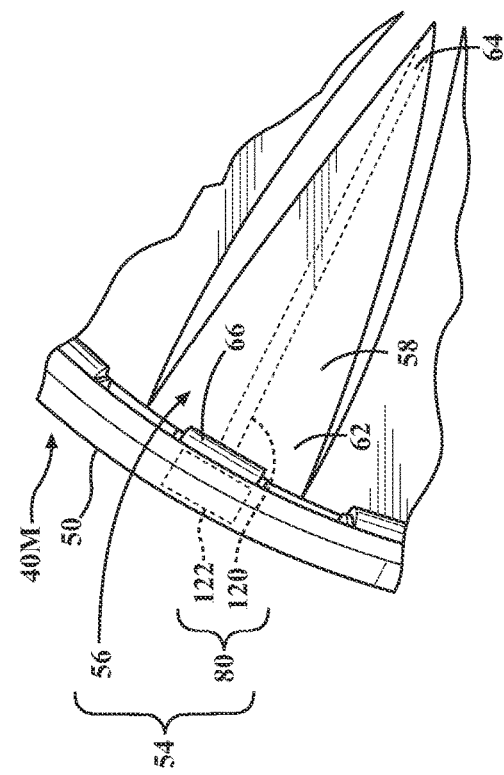
FIGS. 7A and 7B are partial views of the morphing fender skirt in the inline state and the expanded state, respectively, showing the deployment system including another implementation of an actuator coupled to the rib array and operable to act on the rib array to drive the deployment of the morphing fender skirt between the inline state and the expanded state.
Figure 7B:
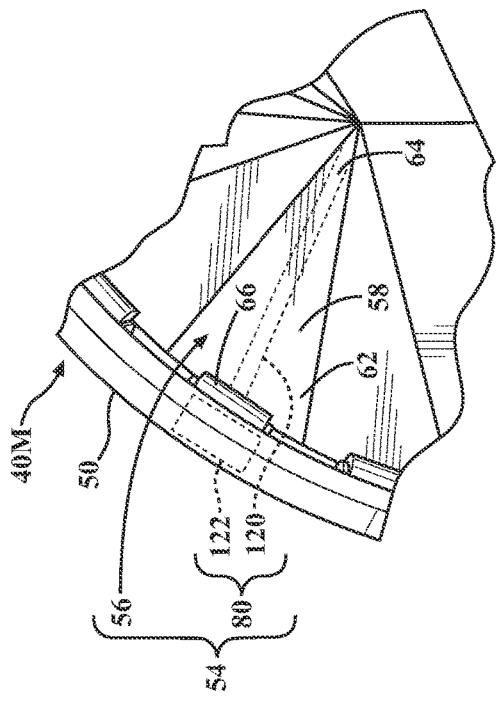

As shown in FIGS. 7A and 7B, in another implementation, the actuator 80 is a system that includes smart material 120 (a.k.a. "active material" or "adaptive material") and a stimulation device 122 for the smart material 120. The smart material 120 is integral with the remainder of the rib array 56 and its ribs 58. The stimulation device 122 is housed in the base 50 and coupled to the smart material 120.

The smart material 120 is integrated with each rib 58. The smart material 120 is represented as being embedded in the ribs 58. The smart material 120 could alternatively or additionally be applied to the ribs 58. The smart material 120 could alternatively or additionally be rendered as a material from which the ribs 58 are made.

In the inline state, the smart material 120 has a stable flattening inducing configuration (e.g., one or more planar or otherwise flattened shapes) in which the smart material 120 acts on the rib array 56 and its ribs 58 to induce the rib array 56 to assume the flattened shape over the base 50. As integrated with each rib 58, the smart material 120 corresponds to the flattened shape of the rib array 56. Moreover, the smart material 120 occupies the inside of the base 50 and, in the vehicle 10, the swept volume of the steered wheel 20S accommodated in the wheel well 22. In the expanded state, on the other hand, the smart material 120 has a stable bending inducing configuration (e.g., one or more bent shapes) in which the smart material 120 acts on the rib array 56 and its ribs 58 to induce the rib array 56 to assume the domed shape over the base 50. As integrated with each rib 58, the smart material 120 corresponds to the domed shape of the rib array 56. Moreover, the smart material 120 is laterally moved away from the inside of the base 50 and, in the vehicle 10, outside the surrounding body 14 to vacate the swept volume of the steered wheel 20S accommodated in the wheel well 22.

The smart material 120 may be made from any combination of materials or other structures that are bistable between the flattening inducing configuration and the bending inducing configuration, and that morph between the flattening inducing configuration and the bending inducing configuration in response to an applied stimulus. The smart material 120 may, for instance, be made in whole or in part from any combination of shape memory polymers (SMPs), shape memory alloys (SMAs), piezoelectric composites, electro-active polymers, and carbon nanotube composites. The stimulus may, for instance, include any combination of heat, electrical energy, magnetic fields and the like.

For purposes of driving the deployment of the morphing fender skirt 40M between the inline state and the expanded state, the stimulation device 122 is operable to generate and apply the requisite stimuli to the smart material 120. The stimulation device 122 may, for instance, include any combination of a heat generation device, an electrical energy generation device, a magnetic field generation device and the like.

Specifically, to drive the deployment of the morphing fender skirt 40M from the inline state to the expanded state, the stimulation device 122 is operated to apply the requisite stimulus to the smart material 120 to which the smart material 120 is responsive to morph from the flattening inducing configuration to assume the bending inducing configuration. As a product of this morphing action, the smart material 120, on behalf of the actuator 80 to which the smart material 120 belongs, acts on each rib 58 to induce each rib 58 to concurrently bend from the flattened shape to assume the bent shape and laterally pivot away from the inside of the base 50. The smart material 120 correspondingly acts on the rib array 56 to which the ribs 58 belong to induce the rib array 56 to bend from the flattened shape thereof to assume the domed shape thereof.

Similarly, to drive the deployment of the morphing fender skirt 40M from the expanded state to the inline state, the stimulation device 122 is operated to apply the requisite stimulus to the smart material 120 to which the smart material 120 is responsive to morph from the bending inducing configuration to assume the flattening inducing configuration. As a product of this morphing action, the smart material 120, on behalf of the actuator 80 to which the smart material 120 belongs, acts on each rib 58 to induce each rib 58 to concurrently bend from the bent shape to assume the flattened shape and laterally pivot toward the inside of the base 50. The smart material 120 correspondingly acts on the rib array 56 to which the ribs 58 belong to induce the rib array 56 to bend from the domed shape thereof to assume the flattened shape thereof.

The vehicle 10 may include a computing device communicatively connected to the actuator 80 and its operable components. The vehicle 10 may operate the computing device to operate the actuator 80 and its operable components to selectively deploy the morphing fender skirt 40M between the inline state and the expanded state. In the case of the actuator 80 including the crossbar mechanism 90, the upright drive face 94 and the drive motor 96, the computing device could selectively deploy the morphing fender skirt 40M between the inline state and the expanded state by operating the drive motor 96 to power the pivoting action of the crossbar mechanism 90. In the case of the actuator 80 including the smart material 120 and the stimulation device 122, the computing device could selectively deploy the morphing fender skirt 40M between the inline state and the expanded state by selectively operating the stimulation device 122 to generate and apply the requisite stimuli to the smart material 120.

The computing device could be dedicated to operating the actuator 80, or could additionally support the operation of other systems of the vehicle 10, for instance, as a part of a central control system therefor. The computing device may include a processor communicatively coupled with a memory. The processor may include any device capable of executing machine-readable instructions, which may be stored on a non-transitory computer-readable medium, for example the memory. The processor may include a controller, an integrated circuit, a microchip, a computer, and/or any other computing device.

The memory may include any type of computer readable medium suitable for storing data and algorithms. For example, the memory may include RAM, ROM, a flash memory, a hard drive, and/or any device capable of storing machine-readable instructions. Various algorithms and data for operating the actuator 80 may reside in whole or in part in the memory. The computing device may, for instance, have a module residing in memory for operating the actuator 80 to selectively deploy the morphing fender skirt 40M between the inline state and the expanded state.

The module may include instructions for operating the actuator 80 to selectively deploy the morphing fender skirt 40M from the inline state to the expanded state during all steering events, or during selected more pronounced steering events. Alternatively, or additionally, the module may include instructions for operating the actuator 80 to selectively deploy the morphing fender skirt 40M from the inline state to the expanded state when the vehicle 10 is being driven along the ground at low speeds, when adjusting the orientation of the vehicle 10 requires more pronounced steering adjustments to the steered wheels 20S and, by extension, more pronounced steering events. The module may include instructions for operating the actuator 80 to selectively deploy the morphing fender skirt 40M from the expanded state to the inline state during the absence of any steering events, or during selected less pronounced steering events. Alternatively, or additionally, the module may include instructions for operating the actuator 80 to selectively deploy the morphing fender skirt 40M from the expanded state to the inline state when the vehicle 10 is being driven along the ground at high speeds, when adjusting the orientation of the vehicle 10 requires less pronounced steering adjustments to the steered wheels 20S and, by extension, less pronounced steering events.

While recited characteristics and conditions of the invention have been described in connection with certain embodiments, it is to be understood that the invention is not to be limited to the disclosed embodiments but, on the contrary, is intended to cover various modifications and equivalent arrangements included within the spirit and scope of the appended claims, which scope is to be accorded the broadest interpretation so as to encompass all such modifications and equivalent structures as is permitted under the law.

What is claimed is:

1. A morphing fender skirt, comprising:
   a rigid, open-ended arched base;
   stretchable exterior skin connected across the base; and
   a structural, bendable rib array connected over the base subjacent to the skin, the rib array configured to bend between a flattened shape over the base, whereby the rib array acts on the skin to impart the flattened shape to the skin across the base, and a domed shape over the base, whereby the rib array acts on the skin to impart the domed shape to the skin across the base.

2. The morphing fender skirt of claim 1, wherein the rib array has at least one of a stable flattened shape and a stable domed shape.

3. The morphing fender skirt of claim 1, wherein the rib array has at least one of a contiguous flattened shape and a contiguous domed shape.

4. The morphing fender skirt of claim 1, wherein the rib array includes a plurality of structural, bendable ribs connected over the base subjacent to the skin, each rib configured to bend between a flattened shape coextensive with the flattened shape of the rib array, whereby the rib acts on the skin to impart the flattened shape to the skin, and a bent shape coextensive with the domed shape of the rib array, whereby the rib acts on the skin to impart the bent shape to the skin.

5. The morphing fender skirt of claim 4, wherein each rib is configured to bend about a single axis between the flattened shape and the bent shape.

6. The morphing fender skirt of claim 4, wherein each rib has at least one of a stable flattened shape and a stable bent shape.

7. The morphing fender skirt of claim 4, wherein the ribs are each elongate, and extend in a converging relationship from respective circumferentially arranged connections with the base.

8. The morphing fender skirt of claim 7, wherein each connection with the base is a hinged connection.

9. The morphing fender skirt of claim 4, wherein the rib array further includes a stretchable band interconnecting respective distal ends of the ribs.

10. The morphing fender skirt of claim 4, wherein the flattened shape of the rib array features at least one of side-to-side and distal end-to-distal end overlap between at least some of the ribs, whereby the domed shape of the rib array is at least partly contiguous.

11. The morphing fender skirt of claim 1, further comprising:
    an actuator coupled to the rib array, the actuator operable to bend the rib array between the flattened shape and the domed shape.

12. The morphing fender skirt of claim 11, wherein the actuator includes:
    a crossbar mechanism connected over the base subjacent to the rib array, the crossbar mechanism configured to support a drive face for reciprocating movement via pivoting action, whereby the drive face acts on the rib array to bend the rib array between the flattened shape and the domed shape; and
    a drive motor coupled between the base and the crossbar mechanism, the drive motor operable to power the pivoting action of the crossbar mechanism.

13. The morphing fender skirt of claim 11, wherein the actuator includes:
    smart material integrated with the rib array, the smart material configured to morph responsive to stimuli, whereby the smart material acts on the rib array to bend the rib array between the flattened shape and the domed shape; and
    a stimulation device coupled to the smart material, the stimulation device operable to apply the stimuli to the smart material.

14. A vehicle, comprising:
    a steered wheel, the steered wheel occupying a swept volume during steering events;
    a wheel well accommodating the steered wheel, wherein the swept volume passes beyond the wheel well; and
    a morphing fender skirt connected across the wheel well, the morphing fender skirt having an inline state, in which the morphing fender skirt has a flattened configuration across the wheel well, and an expanded state, in which the morphing fender skirt has a domed configuration across the wheel well and thereby vacates the swept volume, and including:
    stretchable exterior skin connected across the wheel well; and
    a structural, bendable rib array connected over the wheel well subjacent to the skin, the rib array configured to bend between a flattened shape over the wheel well coextensive with the flattened configuration of the morphing fender skirt, whereby the rib array acts on the skin to impart the flattened shape to the skin across the wheel well, and a domed shape over the wheel well coextensive with the domed configuration of the morphing fender skirt, whereby the rib array acts on the skin to impart the domed shape to the skin across the wheel well.

15. The vehicle of claim 14, wherein the morphing fender skirt has a side profile, and maintains the side profile via the skin in both the inline state and the expanded state.

16. The vehicle of claim 14, wherein the rib array has at least one of a stable flattened shape and a stable domed shape.

17. The vehicle of claim 14, wherein the rib array includes a plurality of structural, bendable ribs connected over the wheel well subjacent to the skin, each rib configured to bend between a flattened shape coextensive with the flattened shape of the rib array, whereby the rib acts on the skin to impart the flattened shape to the skin, and a bent shape coextensive with the domed shape of the rib array, whereby the rib acts on the skin to impart the bent shape to the skin, wherein each rib is configured to bend about a single axis between the flattened shape and the bent shape.

18. The vehicle of claim 14, further comprising:
   an actuator coupled to the rib array, the actuator operable to bend the rib array between the flattened shape and the domed shape; and
   a computing device operable to selectively operate the actuator during steering events.

19. A morphing fender skirt, comprising:
   a rigid, open-ended arched base; and
   a rib array including a plurality of elongate, structural, bendable ribs extending over the base in a converging relationship from respective circumferentially arranged connections with the base, each rib configured to laterally move away from the inside of the base as a product of bending about a single axis from a flattened shape to assume a bent shape, whereby the bent shapes of the ribs together establish a domed shape of the rib array over the base, and laterally return toward the inside of the base as a product of bending about the single axis from the bent shape to assume the flattened shape, whereby the flattened shapes of the ribs together establish a flattened shape of the rib array over the base.

20. The morphing fender skirt of claim 19, further comprising:
   stretchable exterior skin connected across the base, wherein the rib array is subjacent to the skin, whereby the rib array acts on the skin to impart the domed shape thereof to the skin across the base when each rib is laterally moved away from the inside of the base, and acts on the skin to impart the flattened shape thereof to the skin across the base when each rib is laterally returned toward the inside of the base.

21. The morphing fender skirt of claim 2, wherein the rib array has both a stable flattened shape and a stable domed shape.

22. The morphing fender skirt of claim 6, wherein each rib has both a stable flattened shape and a stable bent shape.

23. The vehicle of claim 16, wherein the rib array has both a stable flattened shape and a stable domed shape.

* * * * *